(12) United States Patent
Umino et al.

(10) Patent No.: US 8,312,620 B2
(45) Date of Patent: Nov. 20, 2012

(54) EQUIPMENT FOR MANUFACTURING STATOR

(75) Inventors: Shunichi Umino, Utsunomiya (JP); Ryoichi Ashino, Utsunomiya (JP); Tohru Ikeda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 12/991,663

(22) PCT Filed: May 13, 2009

(86) PCT No.: PCT/JP2009/058879
§ 371 (c)(1),
(2), (4) Date: Nov. 8, 2010

(87) PCT Pub. No.: WO2009/142129
PCT Pub. Date: Nov. 26, 2009

(65) Prior Publication Data
US 2011/0061228 A1    Mar. 17, 2011

(30) Foreign Application Priority Data
May 23, 2008 (JP) ................................. 2008-135225

(51) Int. Cl.
*B23P 19/00* (2006.01)

(52) U.S. Cl. ............................ 29/732; 29/736; 29/564.1

(58) Field of Classification Search ............ 29/596–598, 29/732–736; 118/66, 313–323, 712; 239/225
See application file for complete search history.

(56) References Cited

U.S. PATENT DOCUMENTS

| 4,950,438 | A | * | 8/1990 | Nakamura et al. | 264/272.2 |
| 5,273,059 | A | * | 12/1993 | Gross et al. | 134/57 R |
| 5,685,910 | A | * | 11/1997 | Thigpen et al. | 118/666 |
| 6,061,899 | A | * | 5/2000 | Cardini et al. | 29/736 |
| 2009/0300906 | A1 | * | 12/2009 | Umino et al. | 29/732 |
| 2011/0061228 | A1 | * | 3/2011 | Umino et al. | 29/732 |

FOREIGN PATENT DOCUMENTS

| JP | 60-082050 A | 5/1985 |
| JP | 2003-333789 A | 11/2003 |
| JP | 2006-158094 A | 6/2006 |
| JP | 4073705 B2 | 4/2008 |

* cited by examiner

*Primary Examiner* — Minh Trinh
(74) *Attorney, Agent, or Firm* — Arent Fox LLP (57) ABSTRACT

Equipment for manufacturing a stator comprises a coil conduction mechanism which can supply a current to input terminals of a stator, and a heater mechanism having first and second panel heaters which are provided to face the stator. Heat is generated from a coil by supplying a current to the coil from the coil conduction mechanism and sealants filling the stator are heated. On the other hand, the first and second panel heaters are heated by supplying a current and the sealants are heated from the outside. The operation is controlled such that the heating temperature for the sealants by heat generated from the coil and the heating temperature for the sealants by the heater mechanism are uniform.

9 Claims, 10 Drawing Sheets

EQUIPMENT FOR MANUFACTURING STATOR

CROSS-REFERENCE TO RELATED APPLICATION

This is a National Stage entry of International Application No. PCT/JP2009/058879, filed May 13, 2009, which claims priority of Japanese Application No. 2008-135225 filed May 23, 2008. The disclosure of the prior application is hereby incorporated herein in its entirety by reference.

TECHNICAL FIELD

The present invention relates to a stator manufacturing apparatus (equipment) for manufacturing a stator for use in a rotary machine such as an electric motor or an electric generator. More specifically, the present invention concerns a stator manufacturing apparatus for insulating the coil junctions of a stator with a resin.

BACKGROUND ART

Certain stators for use in rotary machines such as electric motors or the like are made up of a plurality of separate cores, each comprising an arcuate yoke and a pole extending radially inward from the yoke, with a coil wound around the pole.

As disclosed in Japanese Patent No. 4073705, the present applicant has proposed a stator structure, which is produced by winding coils around the insulators of a plurality of separate cores, coupling the cores together and placing the separate cores in a case, and then filling junctions of the coils with a sealant such as a resin or the like and curing the sealant, thereby insulating the junctions.

Generally, the sealant often is made of a thermosetting resin that cures when heated. For curing the sealant in the stator, it has been the practice in the art to place the stator in a heating furnace to heat the stator, or to heat the stator with a heater that is positioned around the stator.

Since the sealant fills up a predetermined volume in the stator, it takes some time for heat to be transferred into the sealant from the surface thereof, with the result that the process of heating the sealant is time-consuming.

As disclosed in Japanese Laid-Open Patent Publication No. 2006-158094, for example, there has been proposed a technical concept for quickly heating a sealant in a stator, so as to cure the sealant in a short time using an external heating mechanism, which heats the sealant from outside of the stator, and a coil energizing mechanism that energizes the coil, which has been insulated by the sealant, in order to heat the sealant.

SUMMARY OF INVENTION

When a stator is manufactured according to the background art disclosed in Japanese Laid-Open Patent Publication No. 2006-158094, however, there is concern over the temperature difference that occurs in the heating process between the surface of the sealant, which is heated by the external heating mechanism, and the inner side of the sealant near the coils. Such a temperature difference is liable to result in different curing rates for the sealant, thus tending to develop strains and cracks in cured areas of the sealant, which are responsible for failures in achieving a desired insulating capability.

It is a general object of the present invention to provide a stator manufacturing apparatus, which is capable of quickly curing a resin at the coil junctions of a stator, thereby enabling the stator to be manufactured in a short period of time with stable quality.

To achieve the above object, there is provided in accordance with the present invention a stator manufacturing apparatus for introducing a resin to junctions of coils and curing the resin in a stator which includes the coils wound on cores and having ends connected to each other at the junctions and to electric feeders, which are externally energizable, comprising:

a coil energizing mechanism for energizing the electric feeders to heat the coils for thereby heating the resin;

an external heating mechanism for heating the resin from outside thereof, the external heating mechanism being disposed in confronting relation to the stator so as to face the junctions of the coils, and which is spaced from the stator by a variable distance; and a control mechanism for controlling an outer temperature of the resin, which is heated by the external heating mechanism, and for controlling an inner temperature of the resin, which is heated by the coils when the coil energizing mechanism is energized, so that the outer temperature and the inner temperature are substantially equal to each other.

According to the present invention, the stator manufacturing apparatus includes the coil energizing mechanism for energizing the stator coils. The coil energizing mechanism energizes the coils in order to heat the coils, thereby heating the inside of the resin, which is introduced into the junctions of the coils. The external heating mechanism, which is disposed in confronting relation to the stator, heats the resin from the exterior thereof in order to heat the outside of the resin. The controller controls the outer and inner temperatures of the resin so that they are made equal to each other.

Since the resin introduced into the coil junctions of the stator can be heated from both the inside and outside thereof, the resin can quickly and reliably be cured, thereby shortening the time required to manufacture the stator.

DESCRIPTION OF EMBODIMENTS

Figure 1:
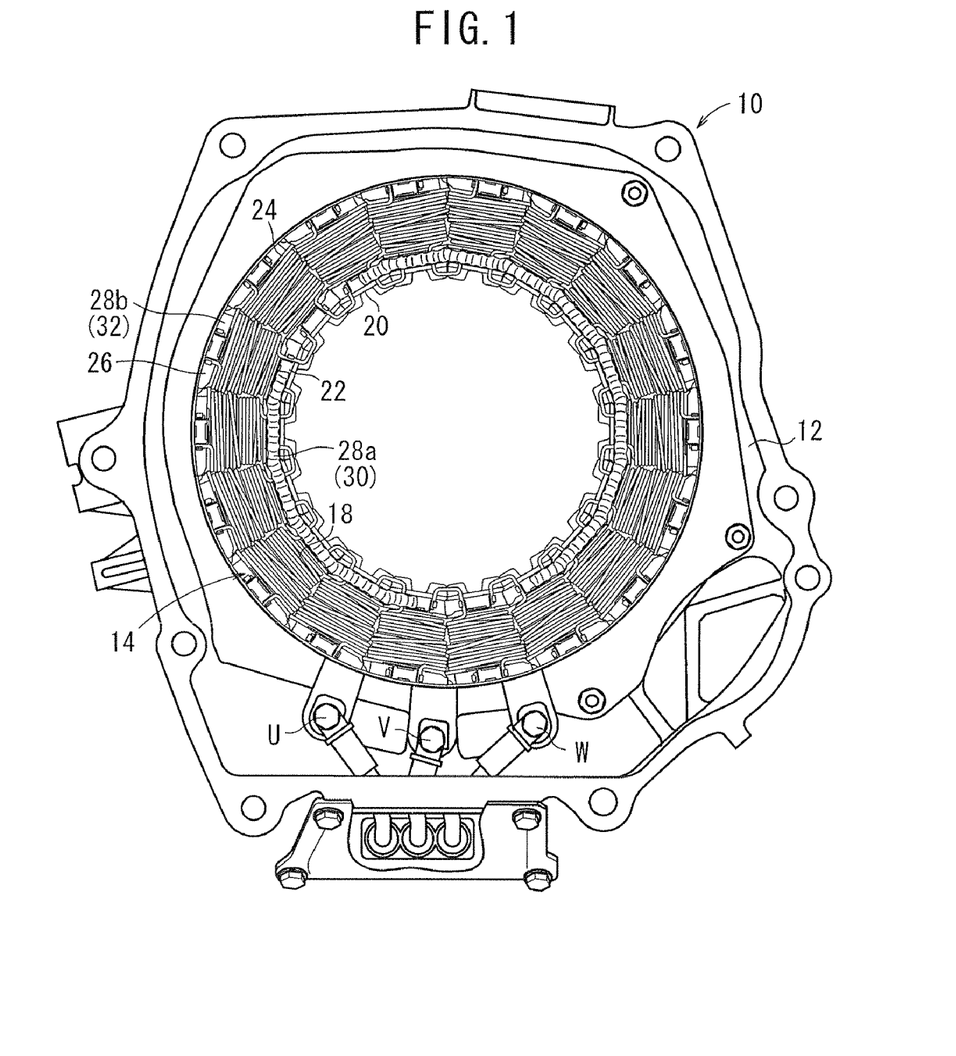
FIG. 1 is a plan view of a stator manufactured by a stator manufacturing apparatus according to a first embodiment of the present invention.
Figure 2:
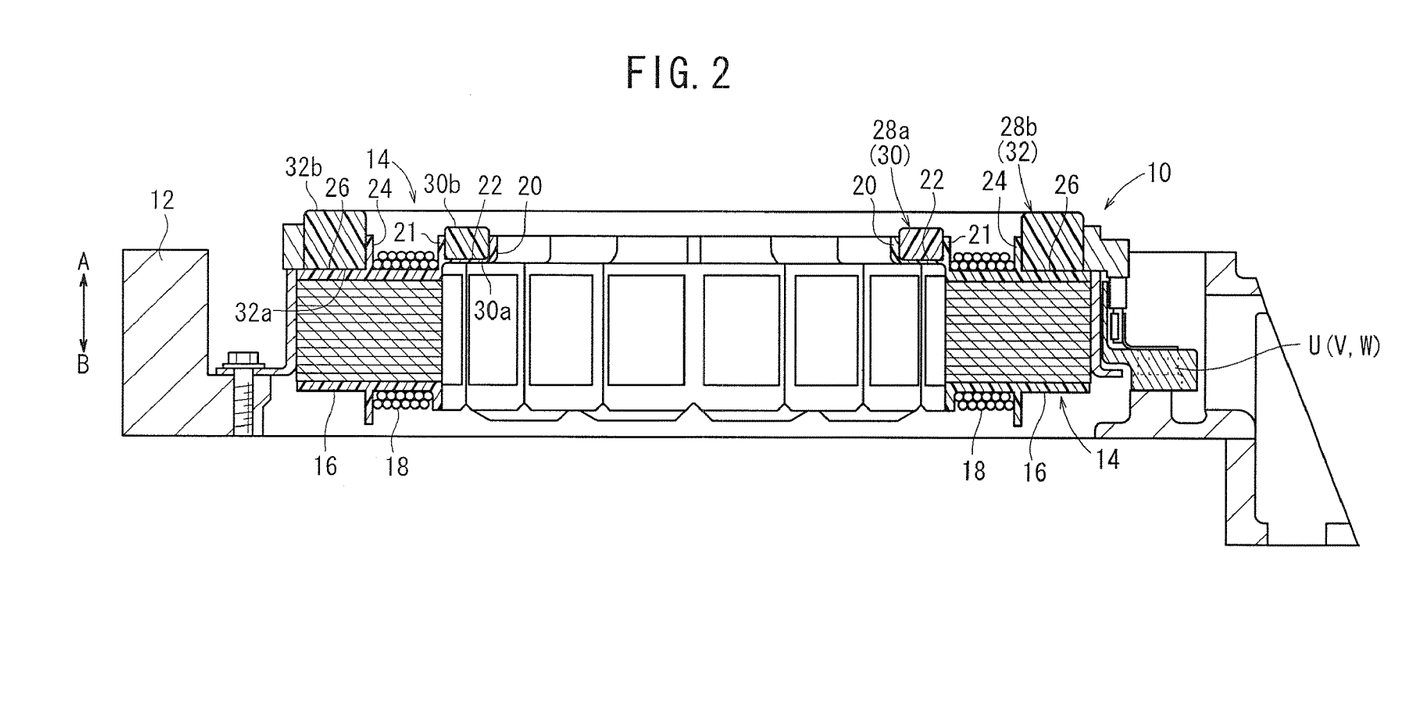
FIG. 2 is a vertical cross-sectional view of the stator shown in FIG. 1.

First, a stator 10 manufactured by a stator manufacturing apparatus 100 according to a first embodiment of the present invention will briefly be described below with reference to FIGS. 1 and 2.

The stator 10 is a three-phase Y-configuration stator comprising a hollow housing 12, three-phase input terminals U, V, W disposed in the housing 12, and a plurality of separate cores (cores) 14 housed within the housing 12. The separate cores 14 support coils 18, which are wound thereon with insulators 16 made of a resin material being interposed therebetween. The coils 18 are connected to the input terminals U, V, W through connection wires (not shown). The separate cores 14 are assembled in an annular pattern along an inner circumferential surface of the housing 12. Every two adjacent separate cores 14 are fitted with and coupled to each other, such that the coils 18 thereof are electrically connected to each other.

Inner circumferential portions of the separate cores 14 define an annular first filling groove 22, which faces the junctions of the coils 18 through inner circumferential walls 20 of the insulators 16 and intermediate walls 21, which are disposed outwardly of the inner circumferential walls 20. Outer circumferential portions of the separate cores 14 define a second annular filling groove 26, which is disposed between an outer circumferential wall 24 and an inner circumferential surface of the housing 12. The first filling groove 22 has a smaller diameter than the second filling groove 26, which is disposed radially outward from the first filling groove 22.

The first and second filling grooves 22, 26 are filled with sealants (resin) 28a, 28b composed of a thermosetting resin such as silicone, for example, which is cured by heating. Cured sealants 28a, 28b secure the junctions of the coils 18 to the separate cores 14 and the housing 12, and also serve to insulate the junctions of the coils 18. More specifically, the sealant 28a in the first filling groove 22 of the stator 10 is cured to result in a first potting body 30. The first potting body 30 has a substantially rectangular cross-sectional shape, including a bottom portion (inner side) 30a and sides surrounded by walls of the insulators 16, and an outwardly exposed surface (outer side) 30b, which is opposite to the bottom portion 30a.

The sealant 28b in the second filling groove 26 of the stator 10 is cured to result in a second potting body 32. The second potting body 32 also has a substantially rectangular cross-sectional shape, similar to the first potting body 30. The first potting body 30 covers a neutral point of the three-phase Y-configuration windings, whereas the second potting body 32 covers the connection wires of the U, V, W phases. The cross-sectional area of the second potting body 32 is greater than the cross-sectional area of the first potting body 30.

More specifically, similar to the first potting body 30, the second potting body 32 has a bottom portion (inner side) 32a and sides partially surrounded by the insulators 16, and an outwardly exposed surface (outer side) 32b, which is opposite to the bottom portion 32a.

The surface 32b of the second potting body 32 is a predetermined distance higher than the surface 30b of the first potting body 30, in a direction away from the separate cores 14 (in the direction indicated by the arrow A).

Since the first filling groove 22 is disposed radially inward of the second filling groove 26 and is smaller in diameter than the second filling groove 26, the volume of the first filling groove 22 is smaller than the volume of the second filling groove 26. Therefore, the amount of sealant 28a that fills the first filling groove 22 is smaller than the amount of sealant 28b that fills the second filling groove 26.

The stator manufacturing apparatus 100, which is used to manufacture the stator 10 described above, will be described below with reference to FIGS. 3 through 5.

The stator manufacturing apparatus 100 comprises a base 116 placed on a floor 112 that supports the stator 10 thereon, a plurality of frames 118a, 118b erected alongside of the base 116, a base plate 120 held by the frames 118a, 118b, a coil energizing mechanism (coil energizing mechanism) 124 for energizing the coils 18 of the stator 10, a heater mechanism (external heating mechanism) 126 disposed in confronting relation to the stator 10 for heating the stator 10 from the outside thereof, a lifting and lowering mechanism 128 for lifting and lowering the heater mechanism 126, a coil power supply 130 for supplying electric current to the coil energizing mechanism 124, and a heater power supply 132 for supplying electric current to the heater mechanism 126.

Figure 3:
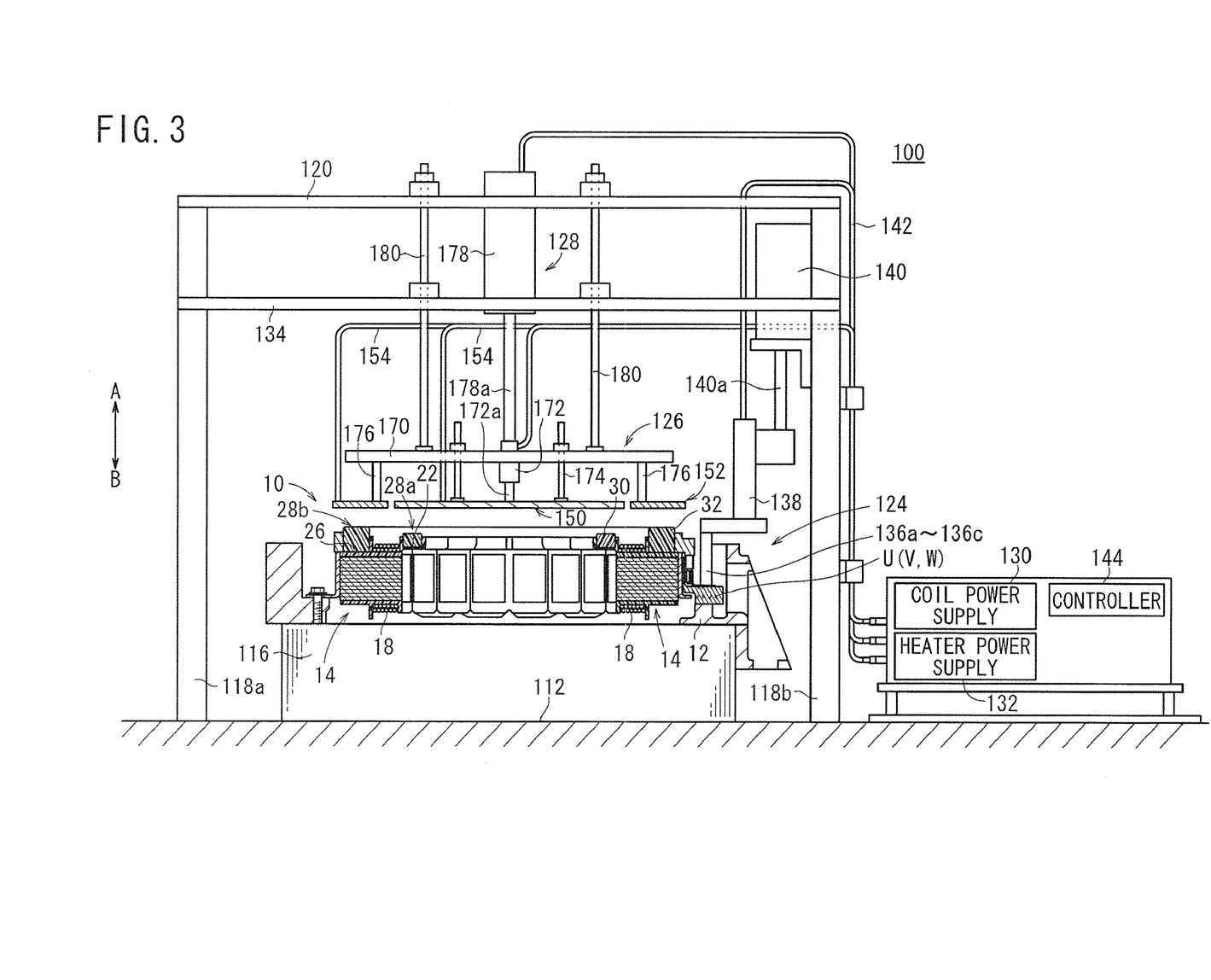
FIG. 3 is a view showing the stator manufacturing apparatus in its entirety.

As shown in FIG. 3, the base 116 is mounted on the floor 112 and has a flat upper surface.

The frames 118a, 118b are erected vertically from the floor 112 around the base 116 and have upper ends interconnected by the base plate 120. An auxiliary plate 134 also is connected to the frames 118a, 118b, at a position spaced a given distance from the base plate 120 (in the direction indicated by the arrow B). The base plate 120 and the auxiliary plate 134 lie parallel to each other.

The coil energizing mechanism 124 comprises a plurality of electrodes 136a through 136c for connection to the input terminals U, V, W (see FIG. 1) of the stator 10, a holder 138 that holds the electrodes 136a through 136c, and an electrode cylinder 140 disposed on sides of the frames 118a, 118b for lifting and lowering the holder 138 and the electrodes 136a through 136c. The electrode cylinder 140 has a cylinder rod 140a that extends therefrom and which is coupled to the holder 138.

The electrodes 136a through 136c comprise three electrodes associated respectively with the input terminals U, V, W of the stator 10. The electrodes 136a through 136c are mounted on one end of the holder 138 and are spaced from each other by predetermined distances. When the electrode cylinder 140 is actuated, the cylinder rod 140a is extended or retracted so as to move the electrodes 136a through 136c toward or away from the input terminals U, V, W.

Leads 142, which are connected to the coil power supply 130, are connected to an upper end of the holder 138. The three electrodes 136a through 136c are connected electrically to the coil power supply 130 through the holder 138. Electric currents from the coil power supply 130 are supplied respectively to the electrodes 136a through 136c, and are controlled by a controller 144, which is connected to the coil power supply 130.

The heater mechanism 126 comprises a first panel heater (heater) 150 in the form of a disk, which is disposed in facing relation to a prescribed position on the base 116, and a second panel heater (heater) 152 in the form of a ring, which is disposed around the first panel heater 150. The first and second panel heaters 150, 152 are connected electrically to the heater power supply 132 by leads 154. The heater power supply 132 supplies electric currents through the leads 154 in order to heat the first and second panel heaters 150, 152.

The first and second panel heaters 150, 152 are associated with temperature sensors 156 (see FIG. 5), each comprising a thermocouple, for example. The temperature sensors 156 detect temperatures of the first and second panel heaters 150, 152, and output signals representative of the detected temperatures to the controller 144, which is connected to the heater power supply 132.

The first panel heater 150 includes a planar heater attached to a plate 158 (see FIG. 5), and is disposed in facing relation to a central area of the base 116. The planar heater is in the form of a thin plate with a Nichrome wire, and is disposed on a lower surface of the plate 158 in confronting relation to the stator 10, which as described later, is placed on an upper surface of the base 116. The first panel heater 150 has an outside diameter slightly greater than the outside diameter of the first filling groove 22 of the stator 10.

Figure 4:
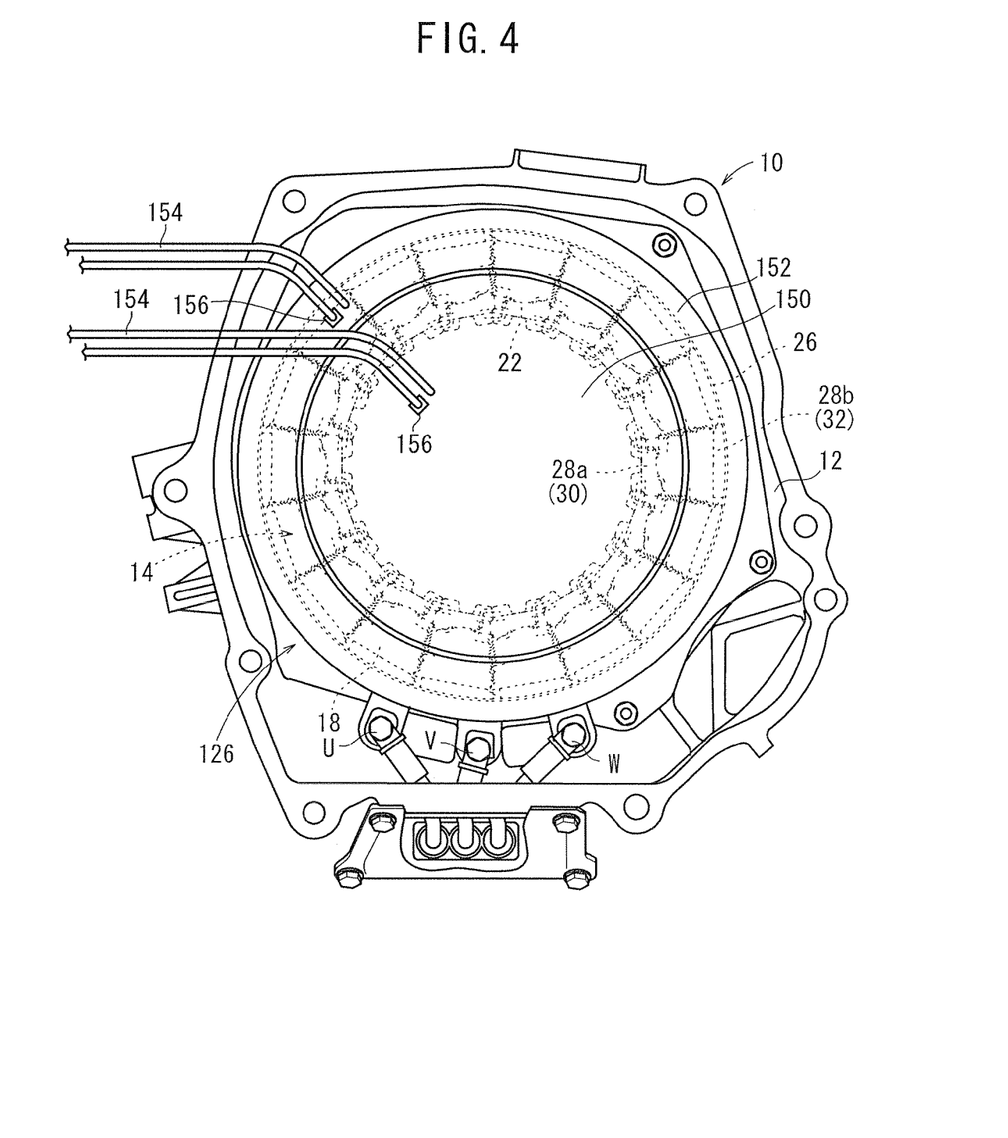
FIG. 4 is a plan view showing a heater mechanism disposed over the stator in the stator manufacturing apparatus shown in FIG. 3.
Figure 5:
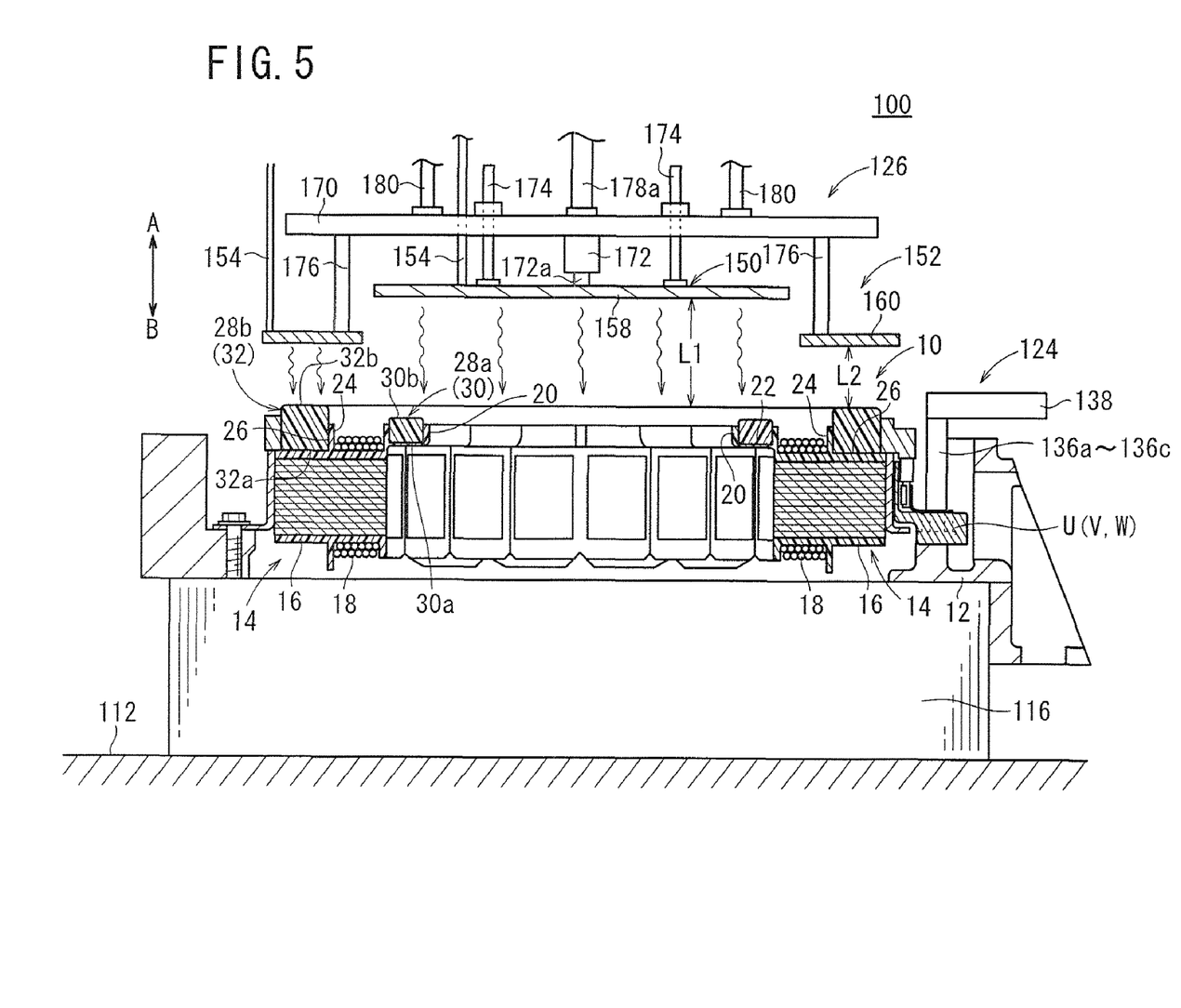
FIG. 5 is an enlarged cross-sectional view showing the heater mechanism disposed near the stator in order to heat the stator in the stator manufacturing apparatus shown in FIG. 3.

In other words, when the stator 10 is placed on the base 116 in confronting relation to the heater mechanism 126 including the first panel heater 150, the first panel heater 150 covers an upper portion of the first filling groove 22, which is filled with the sealant 28a (see FIG. 4).

Similar to the first panel heater 150, the second panel heater 152 includes a planar heater attached to a plate 160, and is disposed around the first panel heater 150. The planar heater is in the form of a thin plate with a Nichrome wire, and is disposed on a lower surface of the plate 160 in confronting relation to the stator 10.

The second panel heater 152 has an inside diameter that is slightly greater than the outside diameter of the first panel heater 150. The second panel heater 152 is spaced a prescribed distance from the outer circumferential edge of the first panel heater 150. The second panel heater 152 has an outside diameter that is slightly greater than the outside diameter of the second filling groove 26. In other words, when the stator 10 is placed on the upper surface of the base 116 below the heater mechanism 126 including the second panel heater 152, the second panel heater 152 confronts the second filling groove 26 and covers an upper portion of the second filling groove 26 (see FIG. 4).

The lifting and lowering mechanism 128 for lifting and lowering the heater mechanism 126, which is constructed as described above, will now be described below.

A movable plate 170 holds the first panel heater 150 and the second panel heater 152. More specifically, the first panel heater 150 has a central portion coupled to a rod 172a of an auxiliary cylinder 172, which is coupled to the movable plate 170. A plurality of first guide shafts 174 are coupled to the first panel heater 150 at positions spaced radially outward from the rod 172a.

The second panel heater 152 is fixed by a plurality of fixing rods 176 to an outer circumferential region of the movable plate 170. When a main cylinder 178 (to be described later) of the lifting and lowering mechanism 128 is actuated, a cylinder rod 178a thereof is extended or retracted so as to move the second panel heater 152 in unison with the movable plate 170 toward or away from the stator 10 (in the directions indicated by the arrows A, B).

The lifting and lowering mechanism 128 includes the first guide shafts 174, which extend through the movable plate 170 for guiding the first panel heater 150 vertically (in the directions indicated by the arrows A, B), and a plurality of second guide shafts 180 that are fixed to the movable plate 170 for guiding the movable plate 170 vertically (in the directions indicated by the arrows A, B).

The second guide shafts 180 are coupled to the movable plate 170 at positions spaced a prescribed distance radially outward from the cylinder rod 178a. Therefore, when the movable plate 170 is moved, the movable plate 170 is guided vertically (in the directions indicated by the arrows A, B) by the second guide plates 180, which extend through the base plate 120 and the auxiliary plate 134.

More specifically, upon actuation of the main cylinder 178, the lifting and lowering mechanism 128 is capable of lifting and lowering the first and second panel heaters 150, 152 of the heater mechanism 126 in unison with each other through the movable plate 170, and upon actuation of the auxiliary cylinder 172, also is capable of displacing the first panel heater 150 independently and vertically (in the directions indicated by the arrows A, B) relative to the second panel heater 152. Stated otherwise, the lifting and lowering mechanism 128 can freely set the spaced distance between the first and second panel heaters 150, 152. Thus, as described later, the lifting and lowering mechanism 128 is capable of setting a balanced temperature TP to an optimum value.

The stator manufacturing apparatus 100 according to the first embodiment of the present invention is basically constructed as described above. Operations and advantages of the stator manufacturing apparatus 100 will be described below with reference to FIGS. 3 through 5.

First, the stator manufacturing apparatus 100 is placed in a preparatory state by positioning the stator 10 on the upper surface of the base 116 such that the first and second filling grooves 22, 26 face upwardly and the input terminals U, V, W face toward the coil energizing mechanism 124, thereby holding the stator 10 on the base 116. Sealants 28a, 28b are introduced into the first and second filling grooves 22, 26 through filling nozzles, not shown. The sealants 28a, 28b are in a liquid phase having an appropriate viscosity and flowability before curing thereof is started.

In such a preparatory condition, the electrode cylinder 140 is actuated in order to cause the holder 138 to lower the electrodes 136a through 136c into contact with the respective input terminals U, V, W of the stator 10. The coil power supply 130 supplies electric currents through the leads 142 in order to energize the coils 18 of the separate cores 14, which are connected to the input terminals U, V, W. The coils 18 are heated gradually so as to heat the bottom portions 30a, 32a of the sealants 28a, 28b, which are closer to the coils 18 in the first and second filling grooves 22, 26 (in the direction indicated by the arrow B).

Since the amount of sealant 28a that fills the first filling groove 22 is smaller than the amount of sealant 28b that fills the second filling groove 26, the heat from the coils 18 heats the sealant 28a more intensively. The temperatures of the sealants 28a, 28b rise, while the temperature of the sealant 28a is kept higher than the temperature of the sealant 28b in the second filling groove 26.

At the same time, the main cylinder 178 of the lifting and lowering mechanism 128 is actuated in order to lower the heater mechanism 126 toward the stator 10 (in the direction indicated by the arrow B), until the heater mechanism 126 is spaced a prescribed distance from the upper surface of the stator 10 in confronting relation thereto. The heater power supply 132 supplies electric currents to the first and second panel heaters 150, 152 through the leads 154, thereby heating the planar heaters of the first and second panel heaters 150, 152. At this time, the sealants 28a, 28b in the first and second filling grooves 22, 26 of the stator 10, which are held in confronting relation to the first and second panel heaters 150, 152, are heated. Also, at this time, the sealants 28a, 28b begin to be heated in the first and second filling grooves 22, 26 from surfaces thereof that are closer to the heater mechanism 126 (in the direction indicated by the arrow A).

The heater mechanism 126 including the first and second panel heaters 150, 152 is set to a preset temperature Th, so that the temperature (outer temperature) T1 of the surfaces 30b, 32b of the sealants 28a, 28b in the first and second filling grooves 22, 26, which confront the heater mechanism 126, is the same as the temperature (inner temperature) T2 of the bottom portions 30a, 32a of the sealants 28a, 28b near the coils 18 (T1=T2).

When the sealants 28a, 28b are heated, the temperatures of the first and second panel heaters 150, 152 are detected by the temperature sensors 156 and output to the controller 144, which is connected to the heater power supply 132. The controller 144 compares the detected temperatures with the preset temperature Th, and then according to a feedback control process controls the electric current amounts supplied to the first and second panel heaters 150, 152 in order to equalize the detected temperatures to the preset temperature Th.

In the present embodiment, since the temperature of the sealant 28a in the first filling groove 22 is higher than the temperature of the sealant 28b in the second filling groove 26, the auxiliary cylinder 172 is actuated to displace the first panel heater 150, which confronts the first filling groove 22, upwardly (in the direction indicated by the arrow A), thereby making the distance L1 (see FIG. 5) between the first panel heater 150 and the stator 10 greater than the distance L2 (see FIG. 5) between the second panel heater 152 and the stator 10 (L1>L2). In other words, the first panel heater 150 is displaced relative to the second panel heater 152 in order to bring the second panel heater 152 closer to the stator 10 than the first panel heater 150. Therefore, the sealant 28b in the second filling groove 26 is heated more intensively than the sealant 28a in the first filling groove 22.

Since the temperature of the sealant 28b in the second filling groove 26, which is heated by the second panel heater 152, can be made higher than the temperature of the sealant 28a in the first filling groove 22, which is heated by the first panel heater 150, the temperature difference between the sealants 28a, 28b due to the different filling amounts of sealants 28a, 28b is reduced in order to heat the sealants 28a, 28b equivalently at approximately the same temperature.

More specifically, the sealants 28a, 28b that fill the first and second filling grooves 22, 26 are uniformly heated from the surfaces 30b, 32b and bottom portions 30a, 32a thereof by the first and second panel heaters 150, 152, which are controlled by the controller 144 so as to be heated to the preset temperature Th, and the first and second panel heaters 150, 152 are displaced relatively and vertically (in the directions indicated by the arrows A, B) based on the temperature difference, which is caused by the different filling amounts of sealants 28a, 28b, thereby heating the sealants 28a, 28b equivalently at approximately the same temperature. Therefore, the sealants 28a, 28b gradually are cured inwardly at substantially identical rates, until the sealants 28a, 28b become fully cured and form the first and second potting bodies 30, 32. As a result, the junctions of the coils 18 of the stator 10 are secured and electrically insulated by the first and second potting bodies 30, 32.

According to the first embodiment, as described above, the stator manufacturing apparatus 100 includes the coil energizing mechanism 124 for energizing the coils 18 of the stator 10 in order to heat the bottom portions 30a, 32a of the sealants 28a, 28b, as well as the heater mechanism 126 disposed in facing relation to the upper surface of the stator 10. The first and second panel heaters 150, 152 of the heater mechanism 126 are energized in order to heat the surfaces 30b, 32b of the sealants 28a, 28b from the outside thereof. Therefore, the sealants 28a, 28b that fill the junctions of the coils 18 of the stator 10 are quickly and reliably cured, thus making it possible to reduce the time required to manufacture the stator 10.

The first panel heater 150 is displaceable relative to the second panel heater 152 in order to adjust the distance L1 between the first panel heater 150 and the stator 10, and to adjust the distance L2 between the second panel heater 152 and the stator 10. Thus, temperatures of the sealants 28a, 28b in the first and second filling grooves 22, 26, which are heated by the first and second panel heaters 150, 152, can be varied independently of each other.

The electric current amounts supplied to the coil energizing mechanism 124 and the heater mechanism 126 may be controlled in order to vary the balanced temperature TP where the temperature to which the bottom portions 30a, 32a of the sealants 28a, 28b are heated by the coils 18 and the temperature to which the surfaces of the sealants 28a, 28b are heated by the first and second panel heaters 150, 152 are equal to each other. Thus, optimum curing temperatures depending on the type of resins used for the filling sealants 28a, 28b can be achieved. As a result, the first and second potting bodies 30, 32 produced by curing the sealants 28a, 28b are free of strains, cracks, etc., and the first and second potting bodies 30, 32 reliably secure and insulate the junctions of the coils 18, thereby making it possible to manufacture the stator 10 that is stable in quality.

Instead of varying the distances L1, L2 between the stator 10 and the first and second panel heaters 150, 152, the planar heaters of the first and second panel heaters 150, 152 may be configured to have different heating properties.

For example, the diameter of the Nichrome wire of the planar heater of the first panel heater 150 may be larger than the diameter of the Nichrome wire of the planar heater of the second panel heater 152, so as to cause the first and second panel heaters 150, 152 to have different heating properties, even if the first and second panel heaters 150, 152 are supplied with the same amount of electric current.

Figure 6:
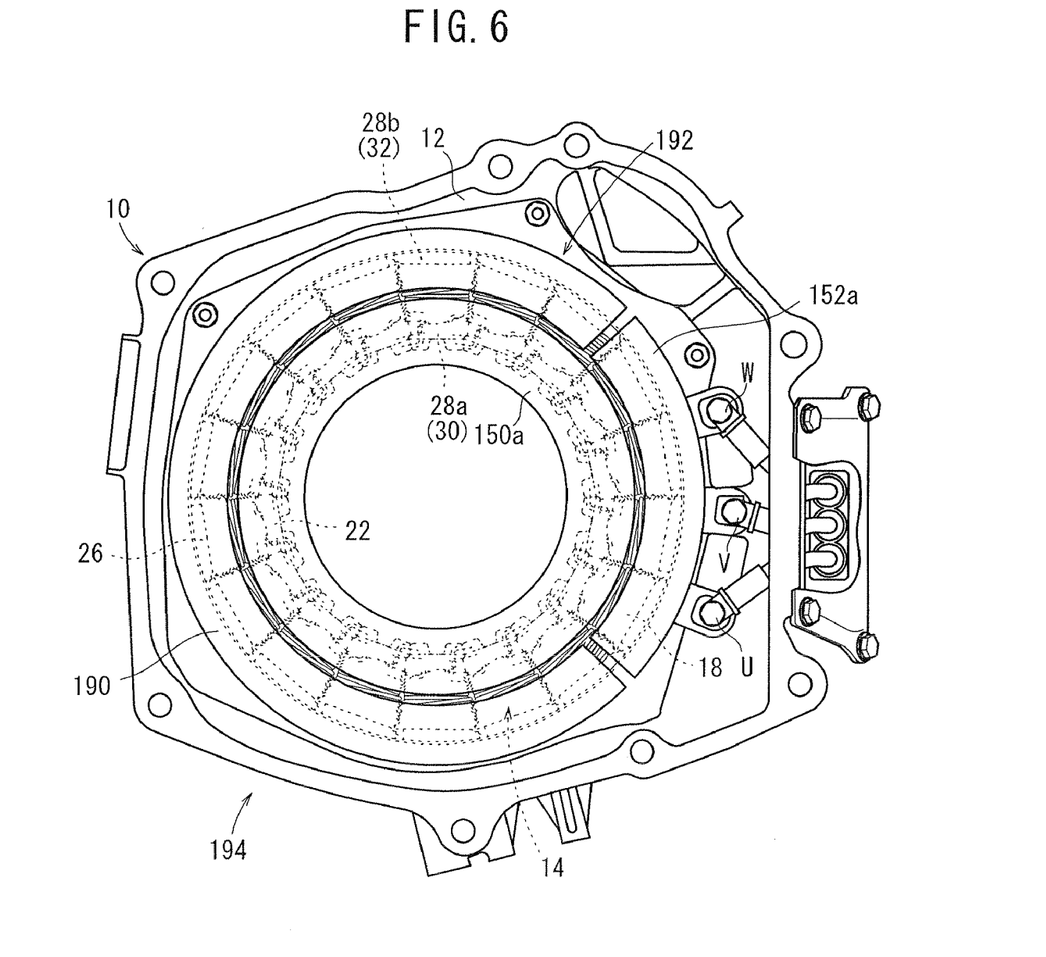
FIG. 6 is a plan view showing the stator disposed below the heater mechanism in the stator manufacturing apparatus, the heater mechanism comprising first through third heater panels.
Figure 7:
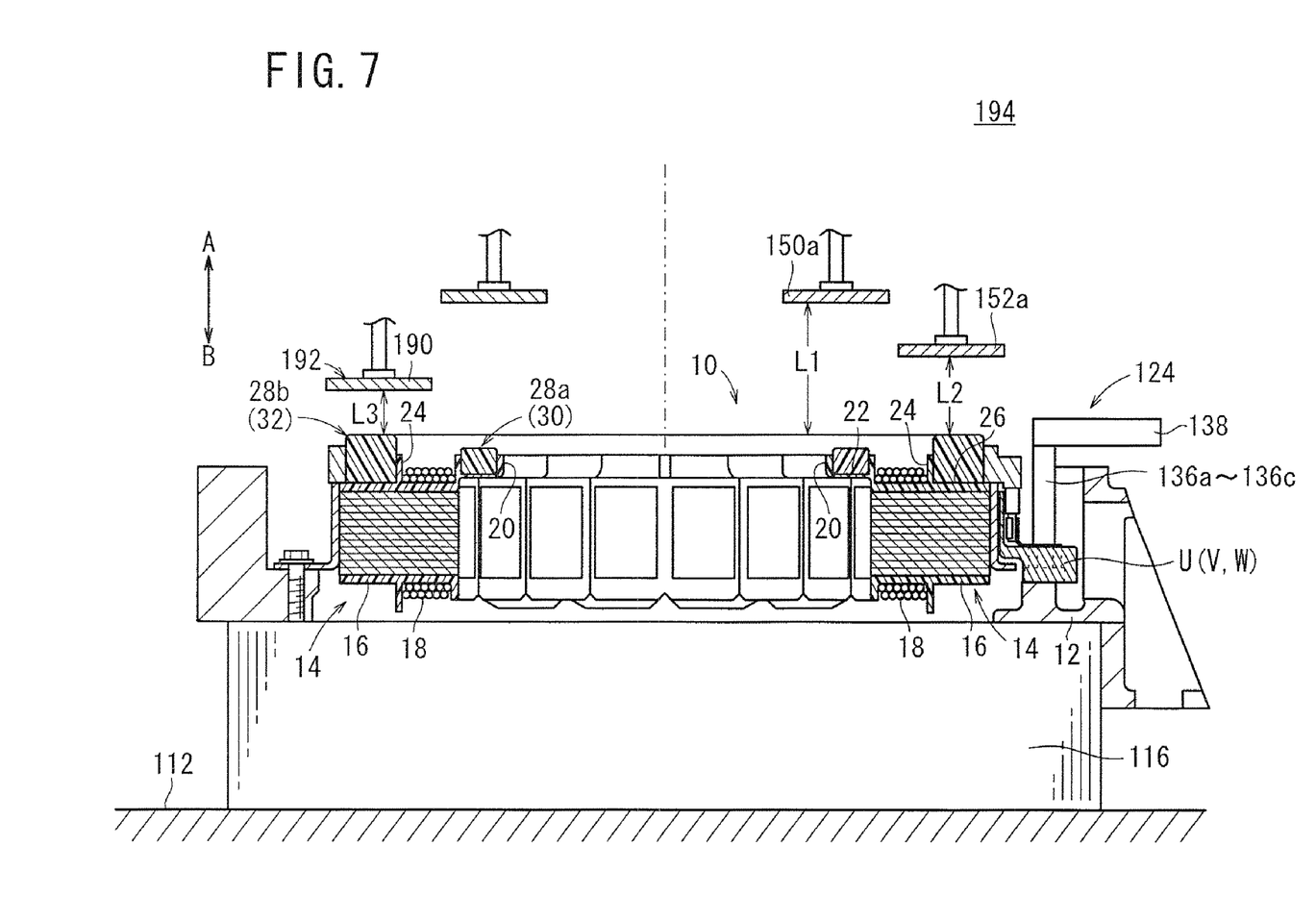
FIG. 7 is a schematic side elevational view of the stator manufacturing apparatus shown in FIG. 6.

The heater mechanism 126 having the first and second panel heaters 150, 152 may be replaced by a different type of heater mechanism. More specifically, as shown in FIGS. 6 and 7, a stator manufacturing apparatus 194 includes a heater mechanism 192 comprising a first panel heater (first heater) 150a for heating the first filling groove 22 of the stator 10, a second panel heater (second heater) 152a having a relatively short arcuate shape for heating a portion of the second filling groove 26 near the input terminals U, V, W, and a third panel heater (third heater) 190 having a relatively long arcuate shape for heating a portion of the second filling groove 26 opposite to the input terminals U, V, W.

The first panel heater 150a has an annular shape facing the first filling groove 22. The second and third panel heaters 152a, 190 are disposed around the first panel heater 150a in facing relation to the second filling groove 26. Lifting and lowering mechanisms, not shown, are capable of lifting and lowering the first through third panel heaters 150a, 152a, 190 independently of each other.

Figure 8:
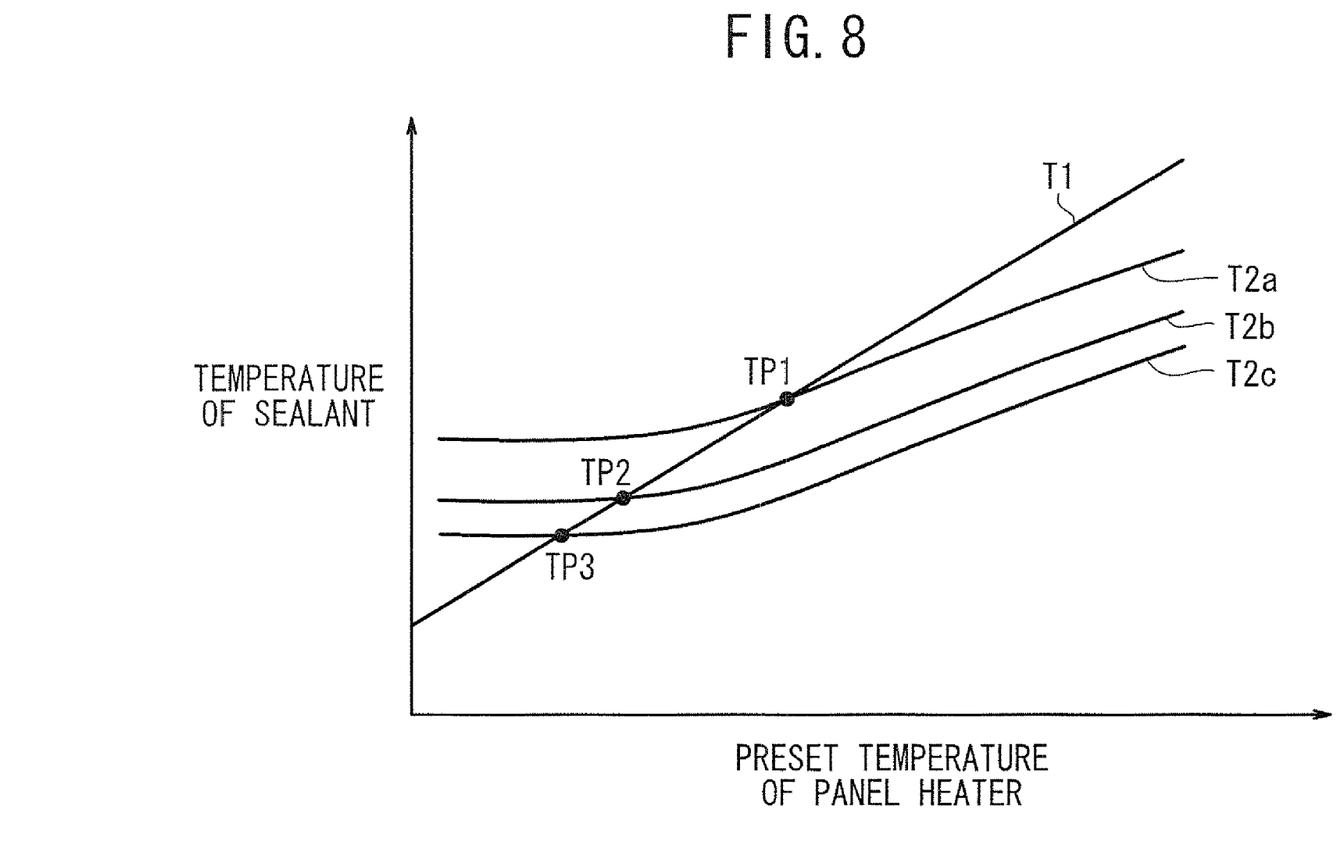
FIG. 8 is a diagram showing characteristic curves representing a relationship between heating temperatures, at which a sealant is heated with a coil energizing mechanism and a heater mechanism, and temperatures of the sealant on surface and bottom portions thereof.

FIG. 8 shows the relationship between a temperature T2a of the bottom portions 30a, 32a of the sealants 28a, 28b, which are heated by heat from the coils 18, in the first filling groove 22 where the neutral point of the three-phase Y-configuration windings is located, a temperature T2b of the portion of the second filling groove 26 near the input terminals U, V, W, a temperature T2c of the portion of the second filling groove 26 opposite to the input terminals U, V, W, and a temperature T1 of the surfaces of the sealants 28a, 28b, which are heated by heat from the coils 18. The preset temperature Th of the heater mechanism 192 will be described below with reference to FIG. 8.

As can be seen from FIG. 8, the temperature T1 of surfaces of the sealants 28a, 28b, the temperature T2a of the neutral point in the first filling groove 22, the temperature T2b of the portion of the second filling groove 26 near the input terminals U, V, W, and the temperature T2c of the portion of the second filling groove 26 opposite to the input terminals U, V, W differ respectively from each other. The temperature T1 has the greatest rate of change, whereas the temperatures T2a, T2b, T2c have essentially the same rates of change. It can also be understood that the temperature T2a is highest, whereas the temperatures T2b and T2c are gradually lower than the temperature T2a in this order. Also, the difference between the temperatures T2b, T2a is greater than the difference between the temperatures T2b, T2c.

More specifically, since the amount of sealant 28a that fills the first filling groove 22 is smaller than the amount of sealant 28b that fills the second filling groove 26, the temperature T2a of the sealant 28a is higher than the temperatures T2b, T2c of the sealant 28b. In the second filling groove 26, since the amount of heat generated by the energized coils 18 is greater near the input terminals U, V, W and smaller opposite to the input terminals U, V, W, the temperature T2b near the input terminals U, V, W is comparatively high relative to the temperature T2c.

Balanced temperatures TP1, TP2, TP3 are established, at which the characteristic curve representing the temperature T1 of the surfaces of the sealants 28a, 28b, which are heated by the heater mechanism 192, and the characteristic curves representing the temperatures T2a, T2b, T2c of the respective portions of the sealants 28a, 28b in the first and second filling grooves 22, 26 are in agreement with each other.

More specifically, the coil energizing mechanism 124 supplies predetermined currents to the coils 18, whereupon the preset temperature Th of the heater mechanism 192 is established to achieve the balanced temperatures TP1, TP2, TP3, where the characteristic curve representing the temperature T1 of the surfaces 30b, 32b and the characteristic curves representing the temperatures T2a, T2b, T2c of the bottom portions 30a, 32a cross each other, thereby making it possible to heat the sealants 28a, 28b uniformly at the same temperatures from the surfaces and bottom portions 30a, 32a thereof. The sealants 28a, 28b can thus be gradually cured with uniform temperature distributions on the surfaces and bottom portions 30a, 32a of the sealants 28a, 28b.

The electric current amounts supplied to the coil energizing mechanism 124 and the heater mechanism 126 may be controlled in order to vary the balanced temperatures TP1, TP2, TP3 where the temperature to which the bottom portions 30a, 32a of the sealants 28a, 28b are heated by the coils 18 and the temperature to which the surfaces of the sealants 28a, 28b are heated by the first and second panel heaters 150, 152 are equal to each other. Thus, optimum curing temperatures depending on the type of resins used for the filling sealants 28a, 28b can be achieved.

Furthermore, the first panel heater 150a, the second panel heater 152a, and the third panel heater 190 may be relatively displaced independently of each other in order to adjust the distances L1, L2, L3 (see FIG. 7) between the stator 10 and the first through third panel heaters 150a, 152a, 190, depending on differences between the temperature T2a of the sealant 28a and the temperatures T2b, T2c of the sealant 28b.

As shown in FIG. 7, the first panel heater 150a, which faces the first filling groove 22 filled with the sealant 28a at the highest temperature, is displaced most widely from the stator 10, whereas the third panel heater 190, which faces a portion at the lowest temperature of the second filling groove 26 opposite to the input terminals U, V, W, is displaced most closely to the stator 10. The second panel heater 152a may be positioned at an intermediate location between the first panel heater 150a and the third panel heater 190.

As a result, the sealants 28a, 28b can be heated in a manner so as to equalize the temperatures of portions thereof based on temperature differences between portions of the sealants 28b, 28b, which are caused when such portions are heated by the coils 18.

Figure 9:
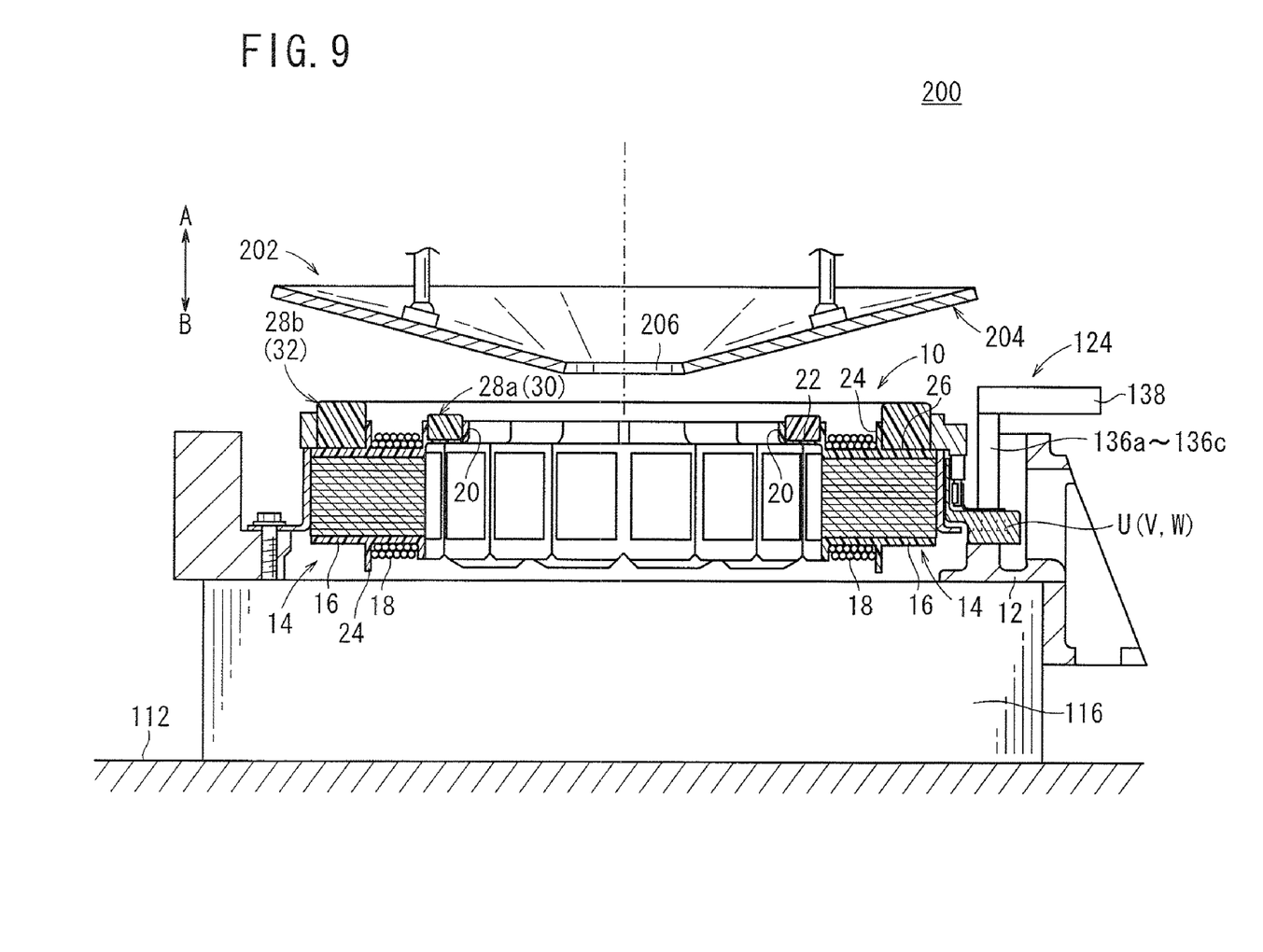
FIG. 9 is a view showing a stator manufacturing apparatus according to a second embodiment of the present invention in its entirety.

FIG. 9 shows a stator manufacturing apparatus 200 according to a second embodiment of the present invention. Parts of the stator manufacturing apparatus 200, which are identical to those of the stator manufacturing apparatus 100 according to the first embodiment, are denoted by identical reference characters, and such features will not be described in detail below.

The stator manufacturing apparatus 200 according to the second embodiment differs from the stator manufacturing apparatus 100 according to the first embodiment, in that the stator manufacturing apparatus 200 includes a heater mechanism 202, including a panel heater (heater) 204 having a substantially conical shape, which is tapered in a direction toward the stator 10 (in the direction indicated by the arrow B).

The panel heater 204 of the heater mechanism 202 has a substantially conical shape with a hole 206 defined centrally therein, and is coaxial with the stator 10.

The panel heater 204 has an inner circumferential edge disposed closest to the stator 10, and grows progressively greater in diameter toward an outer circumferential edge thereof away from the stator 10. Stated otherwise, the panel heater 204 is inclined at a prescribed angle around the axis thereof, and grows progressively greater in diameter toward the outer circumferential edge thereof.

The angle of inclination of the panel heater 204 is set to an angle based on the difference between the height of the sealant 28a (the first potting body 30) in the first filling groove 22 and the height of the sealant 28b (the second potting body 32) in the second filling groove 26.

According to the second embodiment, as described above, the stator manufacturing apparatus 200 includes the substantially conical panel heater 204, which is progressively greater in diameter toward the outer circumferential edge thereof away from the stator 10. Therefore, the distance between the panel heater 204 and the sealants 28a, 28b in the first and second filling grooves 22, 26 of the stator 10 differs radially, thereby changing the amount by which the sealants 28a, 28b are heated depending on the distance. As a consequence, even if temperatures of the sealants 28a, 28b in the respective first and second filling grooves 22, 26, which are heated when the coils 18 are energized, are different from each other, the distance between the panel heater 204 and the sealants 28a, 28b differs radially depending on the temperature difference, thereby allowing the sealants 28a, 28b to be heated at substantially equal temperatures.

Figure 10:
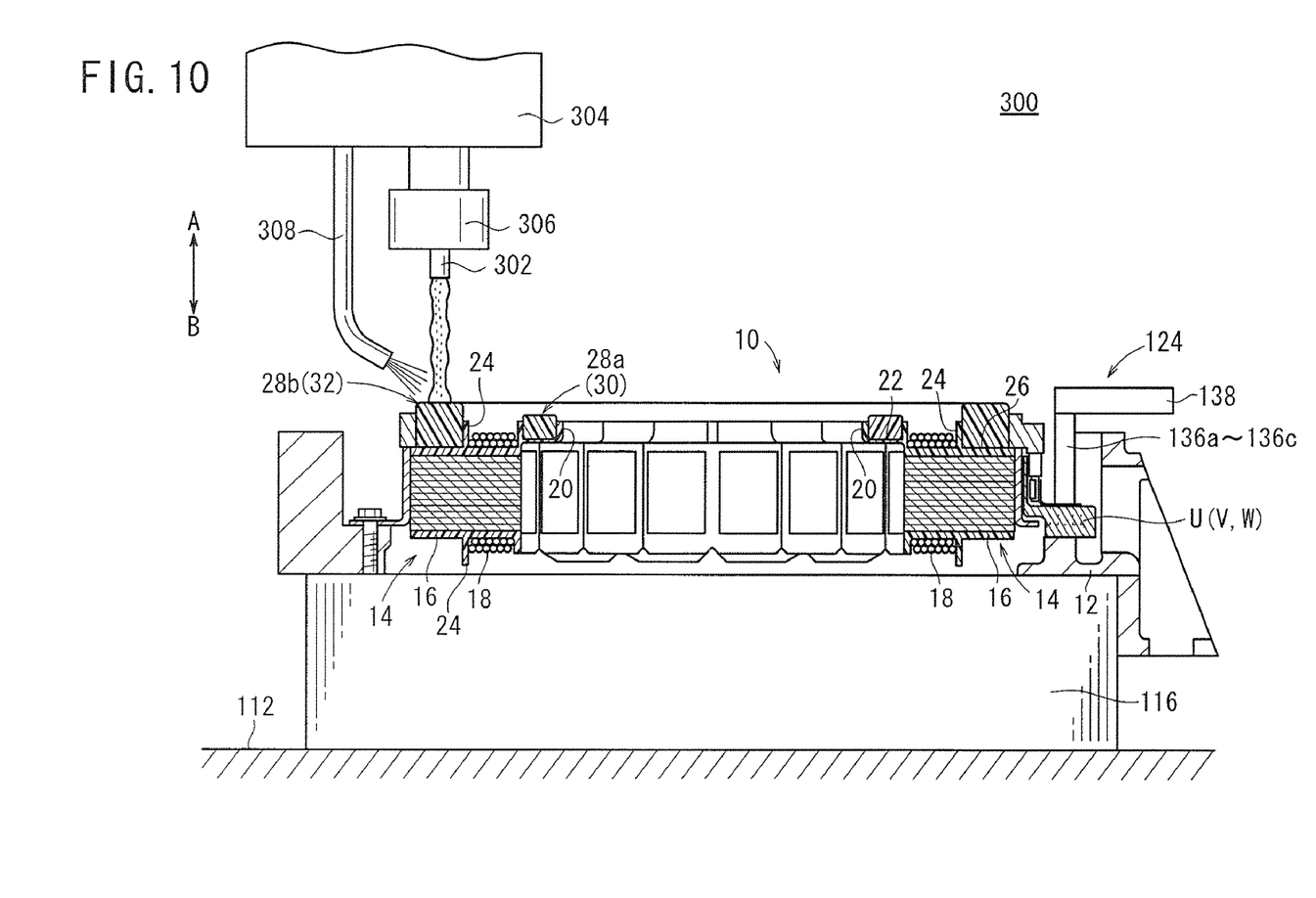
FIG. 10 is a schematic view of a stator manufacturing apparatus according to a modification.

FIG. 10 shows a modified stator manufacturing apparatus 300, in which the sealants 28a, 28b that fill the stator 10 are preheated to a prescribed temperature.

The stator manufacturing apparatus 300 includes a filling nozzle 302 for filling the first and second filling grooves 22, 26 of the stator 10 with the sealants 28a, 28b, a tank 304 that is filled with the sealants 28a, 28b, a nozzle heater (heating device) 306 disposed on a distal end portion of the filling nozzle 302 for heating the filling nozzle 302, and a hot air ejecting mechanism (heating device) 308 for ejecting hot air toward the sealants 28a, 28b as the sealants 28a, 28b are directed out from the filling nozzle 302.

When the tank 304 supplies the sealants 28a, 28b to the filling nozzle 302 and the filling nozzle 302 fills the first and second filling grooves 22, 26 of the stator 10 with the sealants 28a, 28b, the sealants 28a, 28b are heated to a prescribed temperature by the nozzle heater 306 as the sealants 28a, 28b pass through the filling nozzle 302. As the sealants 28a, 28b are directed out from the distal end of the filling nozzle 302 toward the stator 10, the sealants 28a, 28b further are heated by hot air ejected by the hot air ejecting mechanism 308, and then the sealants 28a, 28b are introduced into the first and second filling grooves 22, 26 thereby filling the first and second filling grooves 22, 26.

Since the sealants 28a, 28b are preheated to a prescribed temperature before the sealants 28a, 28b are introduced to fill the first and second filling grooves 22, 26 of the stator 10, the sealants 28a, 28b can quickly be heated to the curing temperature by the heated coils 18 and the heater mechanism 126.

The stator manufacturing apparatus according to the present invention is not limited to the above embodiments, but may be modified in various ways without departing from the scope of the invention.

The invention claimed is:

1. A stator manufacturing apparatus for introducing a resin to junctions of coils and curing the resin in a stator, which includes the coils wound on cores, and having ends connected to each other at the junctions and to electric feeders, which are externally energizable, comprising:
    a coil energizing mechanism for energizing the electric feeders to heat the coils for thereby heating the resin;
    an external heating mechanism configured to heat the resin from outside thereof, the external heating mechanism being disposed opposite to the stator and facing the junctions of the coils, the external heating mechanism is spaced from the stator by a variable distance; and
    a control mechanism for controlling the outer temperature of the resin, which is heated by the external heating mechanism, and for controlling the inner temperature of the resin, which is heated by the coils when the coil energizing mechanism is energized, wherein the variable distance between the external heating mechanism and the stator is adjusted to control the outer temperature of the resin, and wherein the outer temperature of the resin and the inner temperature of the resin are equal to each other.

2. The stator manufacturing apparatus according to claim 1, wherein the stator includes the junctions on inner and outer circumferential sides thereof with the cores being interposed therebetween, and the external heating mechanism includes concentric heaters disposed respectively in facing relation to the junctions on the inner and outer circumferential sides.

3. The stator manufacturing apparatus according to claim 2, wherein the heaters are disposed at respective constant distances from the junctions on the inner and outer circumferential sides in the stator.

4. The stator manufacturing apparatus according to claim 1, further comprising a heating device for heating the resin before the resin is introduced into the stator.

5. The stator manufacturing apparatus according to claim 4, wherein the heating device comprises a nozzle heater for heating a nozzle that fills the stator with the resin.

6. The stator manufacturing apparatus according to claim 5, wherein the heating device comprises a hot air ejecting mechanism for ejecting hot air toward the resin which comes out of the nozzle.

7. The stator manufacturing apparatus according to claim 1, wherein the external heating mechanism comprises a heater, which is substantially conical in shape with a hole defined centrally therein, the heater being disposed coaxially with the stator, the heater having an inner circumferential edge closest to the stator, and which is progressively greater in diameter toward an outer circumferential edge thereof away from the stator.

8. The stator manufacturing apparatus according to claim 1, wherein the external heating mechanism comprises:
    a first heater disposed in facing relation to the junctions on the inner circumferential side of the stator;
    a second heater having an arcuate shape for heating portions of the junctions on the outer circumferential side near the electric feeders; and
    a third heater for heating portions of the junctions on the outer circumferential side opposite to the electric feeders.

9. The stator manufacturing apparatus according to claim 8, wherein the first heater, the second heater, and the third heater are displaceable independently relative to the stator, thereby to adjust respective distances of the first heater, the second heater, and the third heater from the stator.

* * * * *